(12) United States Patent
Sun

(10) Patent No.: US 9,930,585 B2
(45) Date of Patent: Mar. 27, 2018

(54) METHOD AND DEVICE FOR ACTIVELY NOTIFYING RESOURCE STATUS

(71) Applicant: ZTE Corporation, Shenzhen (CN)

(72) Inventor: Lianqiao Sun, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 0 days.

(21) Appl. No.: 15/030,200

(22) PCT Filed: Jun. 12, 2014

(86) PCT No.: PCT/CN2014/079789
§ 371 (c)(1),
(2) Date: May 17, 2016

(87) PCT Pub. No.: WO2014/180441
PCT Pub. Date: Nov. 13, 2014

(65) Prior Publication Data
US 2016/0255546 A1 Sep. 1, 2016

(30) Foreign Application Priority Data
Oct. 21, 2013 (CN) .......................... 2013 1 0496975

(51) Int. Cl.
H04W 36/00 (2009.01)
H04W 72/04 (2009.01)
H04W 92/20 (2009.01)

(52) U.S. Cl.
CPC ... *H04W 36/0083* (2013.01); *H04W 36/0061* (2013.01); *H04W 72/0426* (2013.01); *H04W 92/20* (2013.01)

(58) Field of Classification Search
None
See application file for complete search history.

(56) References Cited

U.S. PATENT DOCUMENTS

| 8,467,803 | B2 | 6/2013 | Ahluwalia |
| 2008/0165727 | A1 | 7/2008 | Xiaoben |
| 2011/0053598 | A1* | 3/2011 | Ahluwalia ............ H04W 36/22 455/436 |
| 2012/0087330 | A1 | 4/2012 | Zhu |
| 2012/0282930 | A1 | 11/2012 | Ahluwalia |

(Continued)

FOREIGN PATENT DOCUMENTS

| CN | 101932034 A | 12/2010 |
| CN | 102104930 A | 6/2011 |

(Continued)

OTHER PUBLICATIONS

International Search Report in international application No. PCT/CN2014/079789, dated Sep. 17, 2014.

(Continued)

*Primary Examiner* — Idowu O Osifade
(74) *Attorney, Agent, or Firm* — Oppedahl Patent Law Firm LLC

(57) ABSTRACT

The present invention provides a method and a device for actively notifying of a resource status, wherein said method comprises: detecting current eNB resource utilization status; when the detected current eNB resource utilization status satisfies alarm conditions, sending present eNB resource utilization status notification information to a nearby eNB.

7 Claims, 2 Drawing Sheets

(56) References Cited

U.S. PATENT DOCUMENTS

| | | |
|---|---|---|
| 2013/0072198 A1 | 3/2013 | Ahluwalia |
| 2013/0072212 A1 | 3/2013 | Nakamura |
| 2013/0137433 A1 | 5/2013 | Ahluwalia |
| 2013/0143575 A1 | 6/2013 | Ahluwalia |
| 2013/0165135 A1 | 6/2013 | Ahluwalia |
| 2013/0201900 A1 | 8/2013 | Zhang |
| 2014/0135015 A1* | 5/2014 | Liu ................ H04W 36/22 455/436 |
| 2015/0085826 A1 | 3/2015 | Ahluwalia |
| 2016/0119844 A1* | 4/2016 | Uchino ............ H04W 36/22 370/229 |
| 2016/0183147 A1* | 6/2016 | Da Silva ......... H04W 36/0055 370/331 |

FOREIGN PATENT DOCUMENTS

| | | |
|---|---|---|
| CN | 102685811 A | 9/2012 |
| JP | 2011511486 A | 4/2011 |
| JP | 2011250211 A | 12/2011 |
| JP | 2011250212 A | 12/2011 |
| WO | 2008035161 A2 | 3/2008 |

OTHER PUBLICATIONS

English Translation of the Written Opinion of the International Search Authority in international application No. PCT/CN2014/079789, dated Sep. 17, 2014.

Supplementary European Search Report in European application No. 14794954.9, dated Sep. 27, 2016.

* cited by examiner

METHOD AND DEVICE FOR ACTIVELY NOTIFYING RESOURCE STATUS

TECHNICAL FIELD

The disclosure relates to inter-eNB (evolved Node B) information exchange in a Long Term Evolution (LTE) system, and in particular to a method and device for proactive notification of a resource status.

BACKGROUND

In an LTE system, an eNB may send a neighbouring eNB a RESOURCE STATUS REQUEST, notifying the neighbouring eNB to perform resource measurement according to the RESOURCE STATUS REQUEST. The RESOURCE STATUS REQUEST may mainly include a marker marking start/stop of the resource measurement, a type of a resource on which the resource measurement is to be performed, a cell where the resource measurement is to be performed, an interval for performing the resource measurement, or the like. After receiving the RESOURCE STATUS REQUEST, the neighbouring eNB may return a RESOURCE STATUS RESPONSE. Then, the neighbouring eNB will perform resource measurement according to the RESOURCE STATUS REQUEST, and inform, via a RESOURCE STATUS UPDATE message, the eNB sending the RESOURCE STATUS REQUEST of a result of the resource measurement.

During such a process, a neighbouring eNB cannot inform the eNB of a resource status of the neighbouring eNB unless the eNB first sends a RESOURCE STATUS REQUEST to the neighbouring eNB. In case of a short supply of resources of the neighbouring eNB, an eNB other than the neighbouring eNB will not be able to know the resource shortage at the neighbouring eNB, and may keep handing User Equipment (UE) over to the neighbouring eNB. This will increase a load on the neighbouring eNB and lower a success rate in access of, and handover to, the neighbouring eNB by UEs.

SUMMARY

In view of this, embodiments herein provide a method and device for proactive notification of a resource status, capable of proactive notification of a resource use status of an eNB, thereby improving a success rate in access of, and handover to, the eNB by UEs.

To this end, a technical solution herein may be implemented as follows.

According to an embodiment herein, a method for proactive notification of a resource status includes:

detecting a resource use status of an evolved Nodes B (eNB);

in response to detection of a resource use status of the eNB meeting a warning condition, sending a notification of the resource use status of the eNB.

The sending a notification of the resource use status of the eNB may include: sending the notification of the resource use status of the eNB to a neighbouring eNB.

The detection of a resource use status of the eNB meeting a warning condition may include: detection, for the first time, of a resource utilization of the eNB exceeding a first pre-set threshold, or of a resource utilization of the eNB less than a second pre-set threshold.

The detecting a resource use status of an evolved Nodes B (eNB) may include detecting the resource use status of the eNB in real time or periodically.

The detection of a resource use status of the eNB meeting a warning condition may include: detection of a resource use status of the eNB different from that from a last detection; and detection of a resource utilization of the eNB exceeding a first pre-set threshold, or of a resource utilization of the eNB less than a second pre-set threshold.

The sending a notification of the resource use status of the eNB may include but not limited to sending the notification of the resource use status of the eNB via a RESOURCE STATUS UPDATE message.

According to an embodiment herein, a device for proactive notification of a resource use status includes a detecting unit, a determining unit, and a sending unit.

The detecting unit is configured for: detecting a resource use status of an evolved Nodes B (eNB), and sending information on the detected resource use status of the eNB to the determining unit.

The determining unit is configured for: receiving the information on the detected resource use status of the eNB, determining whether the resource use status of the eNB meets a warning condition according to the information on the detected resource use status of the eNB, and in response to determination of a resource use status of the eNB meeting the warning condition, triggering the sending unit.

The sending unit is configured for: in response to the triggering by the determining unit, sending a notification of the resource use status of the eNB.

The sending unit may be configured for: sending the notification of the resource use status of the eNB to a neighbouring eNB.

The determining unit may be configured for: in response to detection, for the first time, of a resource utilization of the eNB exceeding a first pre-set threshold, or of a resource utilization of the eNB less than a second pre-set threshold, determining that the resource use status of the eNB meets the warning condition.

The detecting unit may be configured for: detecting the resource use status of the eNB in real time or periodically. The determining unit may be configured for: in response to detection of a resource use status of the eNB different from that from a last detection, and to detection of a resource utilization of the eNB exceeding a first pre-set threshold or of a resource utilization of the eNB less than a second pre-set threshold, determining that the resource use status of the eNB meets the warning condition.

The device may further include a storing unit configured for: storing the information on the detected resource use status of the eNB, a first pre-set threshold, and a second pre-set threshold.

With the method and device for proactive notification of a resource status according to embodiments herein, a resource use status of an eNB is detected; in response to detection of a resource use status of the eNB meeting a warning condition, a notification of the resource use status of the eNB is sent to a neighbouring eNB; after receiving the information on the resource use status, the neighbouring eNB may select a candidate cell or prioritize cells for handing over a UE according to a resource status of the eNB, thus reducing a failure rate in handing a UE from the neighbouring eNB over to the eNB, while prioritizing a success rate in accessing the eNB by a UE; in case of multiple detection of the resource use status of the eNB, when the resource use status remains the same in two consecutive detections, no more message is sent for the current detection until there is a change in the detected status; thus, waste of network resources may be avoided while ensuring that a neighbouring eNB learns accurate information on the resource use status of the eNB under consideration.

DETAILED DESCRIPTION

According to embodiments herein, a resource use status of an evolved Nodes B (eNB) is detected; in response to detection of a resource use status of the eNB meeting a warning condition, a notification of the resource use status of the eNB is sent.

The notification of the resource use status of the eNB may be sent to a neighbouring eNB.

The resource use status of the eNB may be detected for multiple times. The resource use status of the eNB may be detected in real time or periodically.

A resource use status of the eNB meeting the warning condition may be detected by: detection, for the first time, of a resource utilization of the eNB exceeding a first pre-set threshold, or of a resource utilization of the eNB less than a second pre-set threshold. Alternatively, a resource use status of the eNB meeting the warning condition may be detected by: detection of information on a resource use status of the eNB different from information on a resource use status of the eNB from a last detection; and detection of the resource use status of the eNB exceeding a first pre-set threshold, or detection of the resource use status of the eNB less than a second pre-set threshold.

The first pre-set threshold and the second pre-set threshold may be set as required by an actual application.

The first pre-set threshold may be used for indicating a high resource utilization. When the actual resource utilization exceeds the first pre-set threshold, the resource utilization of the eNB is deemed high enough to meet the warning condition. For example, a resource utilization of the eNB exceeding 80% may be deemed meeting the warning condition. The second pre-set threshold may be used for indicating a low resource utilization. When the actual resource utilization is less than the second pre-set threshold, the resource utilization of the eNB is deemed low enough to meet the warning condition. For example, a resource utilization of the eNB less than 20% may be deemed meeting the warning condition. The first pre-set threshold may not be less than the second pre-set threshold.

There may be one or more neighbouring eNBs, depending on a position of another eNB around the eNB and interaction (i.e., communication) between the another eNB and the eNB, that is, the current eNB under consideration.

Figure 1:
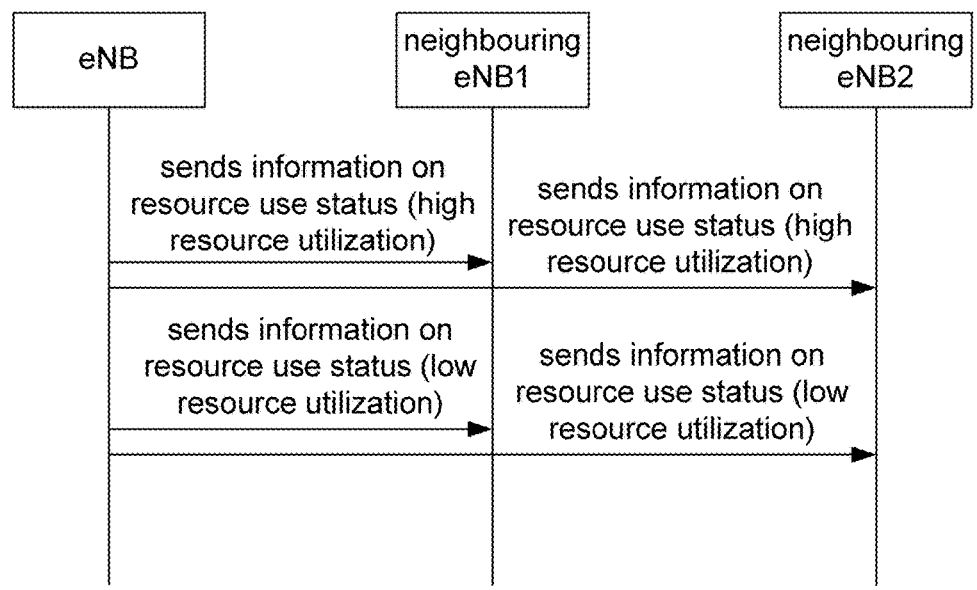
FIG. 1 is a diagram of resource status message sending between eNBs according to an embodiment herein.

FIG. 1 is a diagram of resource status message sending between eNBs according to an embodiment herein. As shown in FIG. 1, two eNBs, eNB1 and eNB2 may neighbour an eNB under consideration. When it is detected that usage of resources in the eNB meets a warning condition, information on a resource use status may be sent to the neighbouring eNBs. For example, a resource utilization in the eNB exceeding a first pre-set threshold is deemed high enough to meet the warning condition, in which case information on the resource use status may be sent to the neighbouring eNBs. A resource utilization in the eNB less than a second pre-set threshold is deemed low enough to meet the warning condition, in which case information on the resource use status may be sent to the neighbouring eNBs.

An order of executing the steps of sending the information on the resource use status is not limited to any specific order. Whenever a high or low enough resource utilization of the eNB is detected, information on a corresponding resource use status may be sent to the neighbouring eNBs. Information on the resource use status may be sent once again to the neighbouring eNB(s) when a change in the resource use status of the eNB is detected, such as in case that the resource use status in last detection shows a high enough resource utilization, while the resource use status in the current detection shows a low enough resource utilization.

When the resource use status in last detection shows a high/low resource utilization, and the resource use status in the current detection still shows a high/low resource utilization, it means that the resource use status has not changed during the recent two detections. In this case, no information on the resource use status will be sent to a neighbouring eNB.

Figure 2:
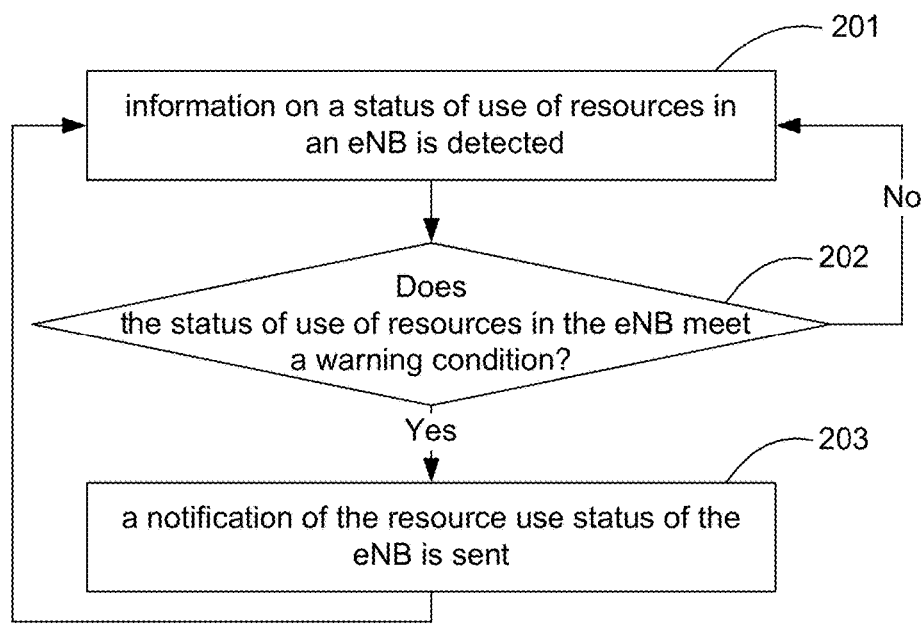
FIG. 2 is a flowchart of a method for proactive notification of a resource use status according to an Embodiment 1 herein.

A technical solution herein is further elaborated below with reference to drawings and embodiments. FIG. 2 is a flowchart of a method for proactive notification of a resource use status according to an Embodiment 1 herein. As shown in FIG. 2, a method for proactive notification of a resource use status according to Embodiment 1 includes steps as follows.

In step 201, a resource use status of an evolved Nodes B (eNB) is detected.

A resource use status of an eNB may be detected by detecting information on a resource utilization of the eNB.

In step 202, it is determined whether the status of use of resources in the eNB meets a warning condition. The flow goes to step 203 when the status of use of resources in the eNB meets the warning condition. Otherwise the flow goes to step 201 when the status of use of resources in the eNB does not meet the warning condition.

The status of use of resources in the eNB may be determined to meet the warning condition as follows.

For a first detection, the warning condition may be deemed met when a resource utilization of the eNB exceeds a first pre-set threshold or is less than a second pre-set threshold.

For a detection after the first detection, the warning condition may be deemed met, when a change in the resource use status of the eNB occurs from the last detection to the detection under consideration, plus it is detected in the detection under consideration that a resource utilization of the eNB exceeds a first pre-set threshold or is less than a second pre-set threshold.

For example, when utilization of resources in the eNB from the current detection exceeds the first pre-set threshold, and utilization of resources in the eNB from the last detection is less than the second pre-set threshold, it may be determined that the status of use of resources in the eNB meets the warning condition, and the flow may go to step 203 to send the notification of the resource use status of the eNB to a neighbouring eNB. Alternatively, when utilization of resources in the eNB from the current detection exceeds the first pre-set threshold, and utilization of resources in the eNB from the last detection also exceeds the first pre-set threshold, it may be determined that the status of use of resources in the eNB fails to meet the warning condition, and the flow may go back to step 201 to continue to detect the information on the resource use status of the eNB.

In step 203, a notification of the resource use status of the eNB is sent.

The notification of the resource use status of the eNB may be sent to a neighbouring eNB.

The notification of the resource use status of the eNB may be sent to a neighbouring eNB in a RESOURCE STATUS UPDATE message, or as resource status indicating information in any other form. The notification of the resource use status may indicate a high or low resource utilization.

The notification of the resource use status of the eNB may be sent to all neighbouring eNB(s) of the eNB. After receiving such information, a neighbouring eNB may select a candidate cell or prioritize cells for handing over a UE according to a resource status in such information.

Figure 3:
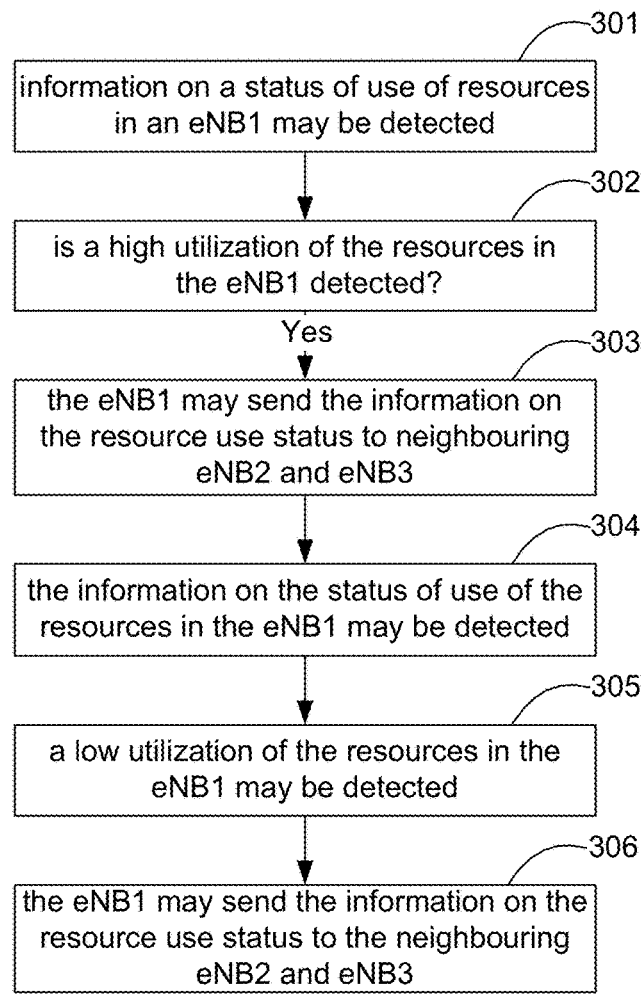
FIG. 3 is a flowchart of a method for implementing proactive notification of a resource use status according to an Embodiment 2 herein.

FIG. 3 is a flowchart of a method for implementing proactive notification of a resource use status according to an Embodiment 2 herein. As shown in FIG. 3, in this embodiment, eNB1 represents the eNB under consideration, and eNB2 and eNB3 represent eNBs neighbouring the eNB1. In an actual application, there may be more neighbouring eNBs, such as neighbouring eNB4 and eNB5. A method for proactive notification of a resource use status according to the embodiment may include steps as follows.

In step 301, a status of use of resources in an eNB1 may be detected for the first time, that is, in a first detection.

A resource use status of the eNB1 may be detected by detecting information on a resource utilization of the eNB1.

In step 302, the status of use of the resources in the eNB1 may be determined. The flow may go to step 303 when a high resource utilization of the eNB1 meeting the warning condition is detected.

A high resource utilization of the eNB1 meeting the warning condition may be a resource utilization of the eNB1 exceeding the first pre-set threshold.

In step 303, the eNB1 may send the information on the resource use status to the neighbouring eNB2 and eNB3.

A notification of the resource use status may be sent to the neighbouring eNB2 and eNB3 as information on the resource use status in a RESOURCE STATUS UPDATE message, or as resource status indicating information in any other form.

After receiving such notification, the eNB2 and eNB3 may select a candidate cell or prioritize cells for handing over a UE according to a resource status in such notification.

In step 304, the information on the status of use of the resources in the eNB1 may continue to be detected.

A resource use status of the eNB1 may be detected by detecting information on a resource utilization of the eNB1.

In step 305, the status of use of the resources in the eNB1 may be determined. The flow may go to step 306 when a low resource utilization of the eNB1 meeting the warning condition is detected.

A low resource utilization of the eNB1 meeting the warning condition may be a resource utilization of the eNB1 less than the second pre-set threshold.

In step 306, the eNB1 may send the information on the resource use status to the neighbouring eNB2 and eNB3.

A notification of the resource use status may be sent to the neighbouring eNB2 and eNB3 as information on the resource use status in a RESOURCE STATUS UPDATE message, or as resource status indicating information in any other form.

After receiving such notification, the eNB2 and eNB3 may select a candidate cell or prioritize cells for handing over a UE according to a resource status in such notification.

Figure 4:
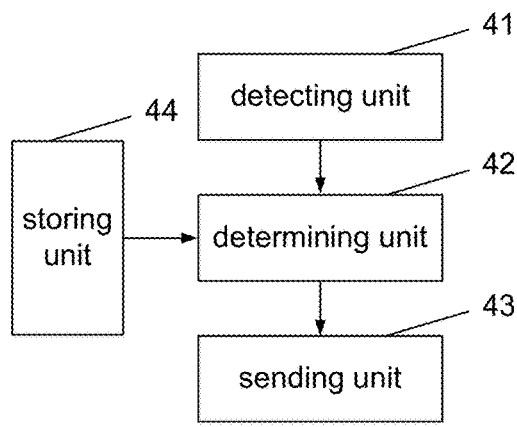
FIG. 4 is a diagram of a structure of a device for proactive notification of a resource status according to an embodiment herein.

An embodiment herein further provides a device for proactive notification of a resource status. The device may be located on an eNB. As shown in FIG. 4, the device includes a detecting unit 41, a determining unit 42, and a sending unit 43.

The detecting unit 41 is configured for: detecting a resource use status of an evolved Nodes B (eNB), and sending information on the detected resource use status of the eNB to the determining unit 42.

The detecting unit 41 may be configured for: detecting the resource use status of the eNB by detecting information on a resource utilization of the eNB.

The determining unit 42 is configured for: receiving the information on the detected resource use status of the eNB, determining whether the resource use status of the eNB meets a warning condition according to the information on the detected resource use status of the eNB, and in response to determination of a resource use status of the eNB meeting the warning condition, triggering the sending unit 43.

The status of use of resources in the eNB may be determined to meet the warning condition as follows.

For a first detection, the warning condition may be deemed met when a resource utilization of the eNB exceeds a first pre-set threshold or is less than a second pre-set threshold.

For a detection after the first detection, the warning condition may be deemed met, when a change in the resource use status of the eNB occurs from the last detection to the detection under consideration, plus it is detected in the detection under consideration that a resource utilization of the eNB exceeds a first pre-set threshold or is less than a second pre-set threshold.

For example, when utilization of resources in the eNB from the current detection exceeds the first pre-set threshold, and utilization of resources in the eNB from the last detection is less than the second pre-set threshold, it may be determined that the status of use of resources in the eNB meets the warning condition, and the notification of the resource use status of the eNB may be sent to a neighbouring eNB. Alternatively, when utilization of resources in the eNB from the current detection exceeds the first pre-set threshold, and utilization of resources in the eNB from the last detection also exceeds the first pre-set threshold, it may be determined that the status of use of resources in the eNB fails to meet the warning condition, and the flow may continue to detect the information on the resource use status of the eNB.

The sending unit 43 is configured for: in response to the triggering by the determining unit, sending a notification of the resource use status of the eNB.

The sending unit may be configured for sending the notification of the resource use status of the eNB to a neighbouring eNB.

The notification of the resource use status of the eNB may be sent to a neighbouring eNB in a RESOURCE STATUS UPDATE message, or as resource status indicating information in any other form. The notification of the resource use status may indicate a high or low resource utilization.

The device for proactive notification of a resource status may further include a storing unit 44 configured for: storing the information on the detected resource use status of the eNB, the first pre-set threshold, and the second pre-set threshold.

The stored resource use status, the first pre-set threshold, and the second pre-set threshold may serve as reference conditions for determination by the determining unit 42.

Those skilled in the art should understand that a function implemented by a processing unit in the device for proactive notification of a resource status as shown in FIG. 4 may be understood by referring to description relevant to the method for proactive notification of a resource status. Those skilled in the art should understand that a function implemented by a processing unit in the device for proactive notification of a resource status as shown in FIG. 4 may be implemented either by a program run on a processor or by a specific logic circuit, such as by a Central Processing Unit (CPU), a Micro Processing Unit (MPU), a Digital Signal Processor (DSP), or a Field Programmable Gate Array (FPGA) located on an eNB; and the storing unit may be realized by various memories or storage media.

Note that the method and device disclosed herein may be implemented in other ways. A device embodiment herein is for illustrative purpose only. For example, division of the units is only based on logic functions. In an actual implementation, there may be other ways of division. For example, a plurality of units or assemblies may be combined together, or integrated to another system. Or, some features may be ignored or not executed. In addition, communication connection among components displayed or discussed may be indirect coupling through some interfaces, devices, or modules, and may be electric, mechanical, or in some other form.

The units described as separate components may or may not be physically separated. Components shown as units may or may not be physical modules. That is, they may be located at one place or distributed to a plurality of network modules. The goal of a solution herein may be fulfilled by selecting part or all of the units as needed.

Furthermore, functional units in an embodiment herein may all be integrated in one processing unit, or may each be a separate unit. Alternatively, two or more of the units may be integrated in one unit. Such an integrated unit may be realized as hardware, or hardware plus software functional units.

A person of ordinary skill in the art may understand that, all or part of the steps of the foregoing method embodiments may be implemented by instructing, by a program, relevant hardware. The program may be stored in a non-transitory computer readable storage medium. When the program runs, the steps included in a method embodiment are performed. The non-transitory storage medium may include various media capable of storing program codes, such as a mobile storage device, a Read-Only Memory (ROM), a Random Access Memory (RAM), a magnetic disk, or an optical disk, etc.

Or when being implemented as a software functional module and sold or used as an independent product, such an integrated unit in the present disclosure may be also stored in a non-transitory computer-readable storage medium. Based on such understanding, the essence of the technical solution of the embodiments of the present disclosure, or the part contributing to the prior art may be embodied in form of a software product. The computer software product may be stored in a storage medium, including a number of instructions allowing a computer device (which may be a personal computer, a server, or a network device, etc.) to execute all or part of the method in embodiments of the present disclosure. The storage medium includes various media capable of storing program codes, such as a mobile storage device, a ROM, a RAM, a magnetic disk, or an optical disk, etc.

A method and device for proactive notification of a resource status according to embodiments herein are illustrated only with an example of an LTE communication system, but are not limited so. Any system related to the method and device for proactive notification of a resource status shall fall within the scope of protection of the present disclosure.

What described are merely embodiments of the present disclosure, and are not intended to limit the protection scope of the present disclosure.

What is claimed is:

1. A method for proactive notification of a resource status, comprising:
   detecting, by an evolved Nodes B (eNB), a resource use status of the eNB;
   in response to detection of a resource use status of the eNB meeting a warning condition, sending, by the eNB, a notification of the resource use status of the eNB to a neighbouring eNB without receiving a resource status request from the neighbouring eNB,
   wherein the detection of a resource use status of the eNB meeting a warning condition comprises:
   detection, for the first time, of a resource utilization of the eNB exceeding a first pre-set threshold, or of a resource utilization of the eNB less than a second pre-set threshold,
   or detection of a resource use status of the eNB different from that from a last detection; and detection of a resource utilization of the eNB exceeding a first pre-set threshold, or of a resource utilization of the eNB less than a second pre-set threshold,
   wherein the neighbouring eNB comprises one or more neighbouring eNBs determined according to a position of another eNB around the eNB and interaction between the another eNB and the eNB.

2. The method according to claim 1, wherein the sending the notification of the resource use status of the eNB comprises but not limited to sending the notification of the resource use status of the eNB via a RESOURCE STATUS UPDATE message.

3. The method according to claim 1, wherein the detecting the resource use status of the eNB comprises detecting the resource use status of the eNB for multiple times in real time or periodically.

4. A device for proactive notification of a resource use status, comprising:
   a processor; and
   a memory storing instructions executable by the processor,
   wherein the processor
   is configured for:
   detecting a resource use status of an evolved Nodes B (eNB);
   determining whether the resource use status of the eNB meets a warning condition, and in response to determination of a resource use status of the eNB meeting the warning condition,
   sending a notification of the resource use status of the eNB to a neighbouring eNB without receiving a resource status request from the neighbouring eNB;
   determining that the resource use status of the eNB meets the warning condition in response to detection, for the first time, of a resource utilization of the eNB exceeding a first pre-set threshold, or of a resource utilization of the eNB less than a second pre-set threshold, or detection of a resource use status of the eNB different from that from a last detection; and detection of a resource utilization of the eNB exceeding a first pre-set threshold, or of a resource utilization of the eNB less than a second pre-set threshold, wherein the neighbouring eNB comprises one or more neighbouring eNBs determined according to a position of another eNB around the eNB and interaction between the another eNB and the eNB.

5. The device according to claim 4, wherein the memory is further configured for: storing information on the detected resource use status of the eNB, the first pre-set threshold, and the second pre-set threshold.

6. The device according to claim 4, wherein the processor is further configured for detecting the resource use status of the eNB for multiple times in real time or periodically.

7. A non-transitory computer-readable storage medium having stored therein instructions that, when executed by a processor, causes the processor to perform a method for proactive notification of a resource status, the method comprising:

detecting, by an evolved Nodes B (eNB), a resource use status of the eNB;

in response to detection of a resource use status of the eNB meeting a warning condition, sending, by the eNB, a notification of the resource use status of the eNB to a neighbouring eNB without receiving a resource status request from the neighbouring eNB, wherein the detection of a resource use status of the eNB meeting a warning condition comprises:

detection, for the first time, of a resource utilization of the eNB exceeding a first pre-set threshold, or of a resource utilization of the eNB less than a second pre-set threshold, or detection of a resource use status of the eNB different from that from a last detection; and detection of a resource utilization of the eNB exceeding a first pre-set threshold, or of a resource utilization of the eNB less than a second pre-set threshold, wherein the neighbouring eNB comprises one or more neighbouring eNBs determined according to a position of another eNB around the eNB and interaction between the another eNB and the eNB.

* * * * *